3,314,925
PROCESS FOR CHLOROSULFONATING SOLID POLYETHYLENE
Kenneth Francis King, Newark, Del., assignor to E. I. du Pont de Nemours and Company, Wilmington, Del., a corporation of Delaware
No Drawing. Filed Dec. 27, 1963, Ser. No. 334,016
5 Claims. (Cl. 260—79.3)

This invention relates to a novel process for the homogeneous chlorosulfonation of polyethylene.

All processes now used for chlorosulfonating polyethylene involve working in rather dilute carbon tetrachloride solutions. This increases the cost of the product not only through the cost of the solvent itself and of its recovery but also through the large size of the equipment required and through the fact that the removal of residual carbon tetrachloride from the product, required because of its toxicity, is difficult. The problem is still more serious when the linear polyethylenes, which are less soluble in carbon tetrachloride, are used. Elimination of the carbon tetrachloride by chlorosulfonating solid polyethylene suspended in the gaseous mixture of chlorine and sulfur dioxide with which it is reacted, has been suggested. The product obtained by these procedures is usually very heterogeneous, however, since the outer part of the solid polyethylene particles is more completely chlorosulfonated than the interior. These heterogeneous products are unsuitable for many purposes because of their inferior properties when compared to the homogeneous products there is, accordingly, a need for making chlorosulfonated polyethylene by a method which avoids the use of large quantities of solvents, and which yields a product which is homogeneous and similar in physical properties to those now made by chlorosulfonation in dilute solution.

It has unexpectedly been found that polyethylene can be chlorosulfonated without being dissolved to form a homogeneous product by the process of this invention which comprises (1) contacting polyethylene with vapors of trichlorofluoromethane at a temperature of about 115° C. to 135° C. and a partial pressure of trichlorofluoromethane of about 5 to 12 atmospheres thereby swelling the polyethylene, (2) contacting and reacting the swollen polyethylene with chlorine at about 1.0 to 3.0 atmospheres partial pressure and sulfur dioxide at about 0.4 to 1.5 atmospheres partial pressure while maintaining said temperature, (3) recovering the chlorosulfonated polyethylene so produced; the polyethylene employed in step (1) being in a form in which the smallest dimension is no greater than 0.003 inch prior to exposure to the trichlorofluoromethane.

Preferably the chlorine and sulfur dioxide pressures are chosen so that the molar ratio of chlorine to sulfur dioxide is between 1.3 to 1 and 3.2 to 1.

The polyethylene used may be any which is suitable for making elastomers by chlorosulfonation in the usual solution process. (See U.S. Patent 2,586,363.) It may be either branched or linear, but the process is quite advantageous when applied to linear polyethylene having a density of 0.95 or greater. The melt index is preferably between 0.2 and 20. The polyethylene may be in the form of wide sheets, narrow strips, threads, strands, or particles. The smallest dimension of these forms is preferably about 0.0015 inch (1.5 mils). When this dimension exceeds 0.003 inch, it is difficult to avoid serious difference in extent of reaction between the surface and center. On the other hand, as the thickness becomes much smaller than 0.001 inch, the difficulty of handling the material becomes greater. Sheets and bands are the preferred forms, since they are in general easier to manipulate. Short sections of strands or threads, although advantageous chemically, are hard to handle because they tend to stick together, thus increasing the effective thickness. It should be pointed out that other highly halogenated hydrocarbons of suitable boiling point, such as carbon tetrachloride, cannot be used effectively in the present invention because they tend to dissolve rather than swell the polyethylene and its reaction products.

The preferred temperatures for the swelling of the polyethylene film with the trichlorofluoromethane and for its reaction with chlorine and sulfur dioxide is between about 120° C. and 125° C. and the preferred partial pressure of the trichlorofluoromethane, which controls the degree of swelling of the film, is between about 6 and 10 atmospheres. When the temperature and the partial pressure of the trichlorofluoromethane are too high, that is, above the limits previously described, the films lack the required strength and when too low, swelling is not enough to cause the rapid diffusion of the chlorine and sulfur dioxide which is responsible for the uniformity of chlorosulfonation throughout the film achieved by the present invention. Thus this diffusion should be rapid while the rate of chlorosulfonation should not be so great that a disproportionate amount of chlorosulfonation takes place near the surface before the reactants diffuse further into the film. Thus it is usually undesirable to catalyze the chlorosulfonation, for example, by ultraviolet radiation, and the inhibiting effect of oxygen upon the reaction may sometimes be used to advantage. If desired the inhibiting effect of the oxygen can be reduced by replacing the oxygen in contact with the polyethylene with an inert gas such as nitrogen thereby displacing the ogygen in the reaction chamber. The term inert is used to define any gas which will not chemically or physically affect the polyethylene or the chlorosulfonation reaction.

The reaction is terminated when the desired amounts of chlorine and sulfur dioxide have been reacted by reducing the pressure and replacing the trichlorofluoromethane and gaseous reactants by a cold inert gas such as nitrogen. The resulting film is largely free of volatile components.

Although, for simplicity, the above discussion has been in terms to polyethylene films, it obviously also applies to bands, threads, and other forms discussed above, upon which the present invention may be carried out.

The following examples will better illustrate the nature of the present invention; however, the invention is not intended to be limited to these examples. Parts and percentages are by weight unless otherwise indicated.

EXAMPLE I

The reaction is carried out in a reaction vessel which is a cylindrical nickel bomb 10 in. high and 4 in. inside diameter with a bolted head containing an inlet tube connected through a valve to a reservoir for liquid sulfur dioxide and chlorine. An exhaust valve is fitted to the bottom of the bomb. The polyethylene film to be reacted is attached to the inside of the bomb by a suspended wire frame. The bomb has a volume of 2.072 liters and is heated by serpentine resistance heater wound about its outer wall. A film 0.0017 in. thick, weighing 0.62 g., of a linear polyethylene of melt index 3 is attached to the wire frame. Trichlorofluoromethane (87.8 g.) is introduced as a liquid into the bottom of the bomb and as a small portion of it vaporizes, as the head is being replaced, it displaces most of the air. The bomb is then heated to 122° C. with the system closed. A liquified mixture of chlorine (8.1 g.) and sulfur dioxide (2.7 g.) is then added (both in large excess of the quantities needed for complete reaction) from the reservoir. At the end of 2.5 minutes the reaction is halted by opening the exhaust valve at the bottom of the bomb and flushing air through the inlet tube. During reaction the partial pressure of chlorine in the reactor is 1.6 atm., of sulfur dioxide is 0.66 atm. and of trichlorofluoromethane is 10.0 atm. are used and the reaction is run for 3.0 minutes. 2.4. The product, which is solvent-free, contains 29.5% chlorine and 0.82% sulfur and is rubbery and almost completely soluble in chloroform. The physical properties, after compounding and curing of a larger amount of substantially the same material, resulting by blending several runs under similar conditions giving 25.5 to 29.5% chlorine and 0.5% to 0.88% sulfur, are given in Table I infra.

EXAMPLE II

The same equipment and procedure are used as in Example I except that 8.0 g. of chlorine giving a partial pressure of 1.8 atm., 2.5 g. of sulfur dioxide giving 0.61 atm., and 67.3 g. of trichlorofluoromethane giving 7.7 atm. are used and the reaction is run for 3.0 minutes. The ratio of chlorine to sulfur dioxide is 3.0 The rubbery product obtained contains 39.1% chlorine and 1.4% sulfur and possesses very good properties.

EXAMPLE III

The same equipment and procedure are used as in Example I except that only 5.3 g. of chlorine (1.2 atm. partial pressure) and 1.8 g. of sulfur dioxide (0.44 atm.) are used, and air is completely displaced from the reactor by nitrogen before addition of the trichlorofluoromethane. Even though the partial pressure of the chlorine is only two thirds of that in Example I, the chlorination is more complete due to the absence of inhibiting oxygen and the rubbery product contains 34.3% chlorine instead of 29.5%. The sulfur content is 0.65%. As in Example I, the properties of a cured composite sample from a number of similar runs, containing 30.3 to 37.4% chlorine and 0.50 to 0.95% sulfur are given in Table I.

TABLE I

Each sample was compounded according to the following recipe:

| Ingredient: | Parts by weight |
|---|---|
| Chlorosulfonated polymer | 100 |
| Sublimed litharge | 25 |
| Pentamethylene tetrasulfide | 2 |
| Benzothiazyl disulfide | 0.5 |
| Furnace black (SRP) cured 30 min. at 153° C. | 25 |

|  | Product of— | | A standard made in Solution [1] |
|---|---|---|---|
|  | Ex. 1 | Ex. III |  |
| Modulus (p.s.i.): | | | |
| At 100% | 550 | 500 | 350 |
| At 200% | 1,375 | 1,540 | 1,260 |
| At 300% | | 2,935 | 2,920 |
| Tensile strength (p.s.i.) | 1,885 | 3,200 | 3,850 |
| Elongation at break (percent) | 245 | 320 | 330 |
| Resilience [2] (percent) | 48 | 42 | 59 |
| Hardness, Shore A | 70 | 74 | 65 |
| Permanent set at break (percent) | 20 | 10 | 4 |

[1] Linear polyethylene chlorosulfonated in carbon tetrachloride and containing 34.5% Cl and 0.97% S.
[2] A.S.T.M. D945-59.

The close approach of the properties of the product of Example III in Table I to those of the product of very similar chlorine and sulfur content made in carbon tetrachloride solution indicates that the product of Example III is almost as homogeneous as the satisfactorily homogenous material of the prior art.

Although the preceding examples have been chosen, for simplicity, for batch operation using small pieces of polyethylene film, it is obvious that the process may be carried out continuously. For example, a continuous film or band is passed continuously between closely fitting rollers first into a vessel containing the vapor of trichlorofluoromethane and then into another containing chlorine and sulfur dioxide at the required temperature and pressure and then through another pair of rollers to a vessel at lower temperature and pressure, where the volatile materials in the film are removed. Chlorine, sulfur dioxide, and trichlorofluoromethane are continuously fed to maintain the desired partial pressures in contact with the film. A portion of the vapor phase containing by-product HCl is continuously removed, cooled to condense the $Cl_2$, $SO_2$ and $CCl_3F$, which are returned to the reaction. The HCl, thus separated, is removed. The film, if not self-supporting, may be carried on a suitable support such as a continuous open mesh screen.

Thus, the process of the present invention gives a convenient method for preparing chlorosulfonated polyethylene without putting it into solution. The product is substantially the same as that made in solution by the present methods and hence, like the present product, may be used wherever an elastomer of excellent to outstanding resistance to oxidation and other chemical attack, combined with good physical properties, is required.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for chlorosulfonating solid polyethylene which comprises (1) contacting polyethylene with vapors of trichlorofluoromethane at a temperature of from about 115° C. to 135° C. and a partial pressure of said trichlorofluoromethane of from about 5 to 12 atmospheres thereby swelling said polyethylene, (2) contacting and reacting said swollen polyethylene with chlorine at about 1 to 3 atmospheres partial pressure and sulfur dioxide at about 0.4 to 1.5 atmospheres partial pressure while maintaining said temperature, and (3) recovering the chlorosulfonated polyethylene so produced; the polyethylene employed in step (1) having a melt index between about 0.2 and 20, and having its smallest dimension no greater than 0.003 inch prior to exposure to said trichlorofluoromethane.

2. A process for chlorosulfonating solid polyethylene which comprises (1) contacting polyethylene with vapors of trichlorofluoromethane at a temperature of from about 120° C. to 125° C. and a partial pressure of said trichlorofluoromethane of from about 6 to 10 atmospheres thereby swelling said polyethylene, (2) contacting and reacting said swollen polyethylene with chlorine at about 1 to 3 atmospheres partial pressure and sulfur dioxide at about 0.4 to 1.5 atmospheres partial pressure while maintaining said temperature, the molar ratio of said chlorine to sulfur dioxide being between about 1.3 to 1 and 3.2 to 1, and (3) recovering the chlorosulfonated polyethylene so produced; the polyethylene employed in step (1) having a melt index between about 0.2 and 20, and having its smallest dimension from about 0'001 to 0.003 inch prior to exposure to said trichlorofluoromethane.

3. A process as defined in claim 2 where said polyethylene is in the form of a film having a thickness of about 0.0015 inch.

4. A process as defined in claim 1 wherein said polyethylene has a density of at least about 0.95.

5. A process as defined in claim 2 wherein said polyethylene is in the form of a film having a density at least about 0.95.

References Cited by the Examiner

UNITED STATES PATENTS 2,945,842   7/1960   Eichhorn et al. _____ 260—79.3

JOSEPH L. SCHOFER, *Primary Examiner.*

L. EDELMAN, *Assistant Examiner.*